United States Patent
Maeda et al.

(10) Patent No.: US 9,340,690 B2
(45) Date of Patent: *May 17, 2016

(54) INK SET AND RECORDING METHOD (71) Applicant: Brother Kogyo Kabushiki Kaisha, Nagoya-shi, Aichi-ken (JP)

(72) Inventors: Mitsunori Maeda, Nagoya (JP); Kenjiro Imai, Toyohashi (JP); Ayako Ohishi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,189

(22) Filed: Mar. 30, 2015

(65) Prior Publication Data

US 2015/0275003 A1 Oct. 1, 2015

(30) Foreign Application Priority Data

Mar. 31, 2014 (JP) ................................ 2014-072045

(51) Int. Cl.
| | | |
|---|---|---|
| *G01D 11/00* | (2006.01) |
| *C09D 11/322* | (2014.01) |
| *C09D 11/102* | (2014.01) |
| *C09D 11/40* | (2014.01) |
| *C09D 11/54* | (2014.01) |

(52) U.S. Cl.
CPC ............ *C09D 11/322* (2013.01); *C09D 11/102* (2013.01); *C09D 11/40* (2013.01); *C09D 11/54* (2013.01)

(58) Field of Classification Search
None
See application file for complete search history.

(56) References Cited

U.S. PATENT DOCUMENTS

| | | | |
|---|---|---|---|
| 5,609,671 | A | 3/1997 | Nagasawa |
| 5,837,045 | A | 11/1998 | Johnson et al. |
| 7,922,805 | B2 | 4/2011 | Kowalski et al. |
| 8,016,404 | B2 | 9/2011 | Kato et al. |
| 8,858,695 | B2 | 10/2014 | Gu et al. |

(Continued)

FOREIGN PATENT DOCUMENTS

| | | |
|---|---|---|
| JP | H083498 A | 1/1996 |
| JP | 2000-513396 A | 10/2000 |

(Continued)

OTHER PUBLICATIONS

Jun. 22, 2015—(US) Non-Final Office Action—U.S. Appl. No. 14/673,299.

(Continued)

*Primary Examiner* — Erica Lin
(74) *Attorney, Agent, or Firm* — Banner & Witcoff, Ltd.

(57) ABSTRACT

An ink set including: a treatment agent containing 2,2,4-trimethyl-1,3-pentanediol-1-monoisobutyrate or a derivative thereof; and a bright pigment ink containing a bright pigment and water, wherein the treatment agent or the bright pigment ink contains urethane resin; and the ink set satisfies the following conditions (A) and (B):

$$1 \leq X \leq 6 \quad (A)$$

$$0.2 \leq Y/X \leq 2 \quad (B)$$

X: the sum of a blending amount (% by weight) of the urethane resin in the treatment agent and a blending amount (% by weight) of the urethane resin in the bright pigment ink Y: a blending amount (% by weight) of the 2,2,4-trimethyl-1,3-pentanediol-1-monoisobutyrate and the derivative thereof in the treatment agent.

18 Claims, 2 Drawing Sheets

(56) References Cited

U.S. PATENT DOCUMENTS

| | | |
|---|---|---|
| 8,916,625 B2 | 12/2014 | Denda et al. |
| 2006/0201380 A1 | 9/2006 | Kowalski et al. |
| 2007/0100023 A1 | 5/2007 | Burns et al. |
| 2007/0100024 A1 | 5/2007 | Gu et al. |
| 2008/0241398 A1 | 10/2008 | Kato et al. |
| 2010/0227181 A1* | 9/2010 | Kitamura ................... 428/457 |
| 2010/0261813 A1* | 10/2010 | Bobsein et al. ................. 524/48 |
| 2011/0205288 A1* | 8/2011 | Matsuyama et al. ............ 347/20 |
| 2012/0038702 A1 | 2/2012 | Kagata et al. |
| 2013/0108841 A1 | 5/2013 | Denda et al. |

FOREIGN PATENT DOCUMENTS

| | | |
|---|---|---|
| JP | 2008-524400 A | 7/2008 |
| JP | 2008-246821 A | 10/2008 |
| JP | 2009-515007 A | 4/2009 |
| JP | 2010-280830 A | 12/2010 |
| JP | 2012-035591 A | 2/2012 |
| JP | 2013-091761 A | 5/2013 |
| WO | 9748769 A1 | 12/1997 |
| WO | 2006-066132 A2 | 6/2006 |

OTHER PUBLICATIONS

Jun. 22, 2015—(US) Non-Final Office Action—U.S. Appl. No. 14/673,394.
Mar. 30, 2015—(US) Co-pending U.S. Appl. No. 14/673,291.
Mar. 30, 2015—(US) Co-pending U.S. Appl. No. 14/673,299.
Mar. 30, 2015—(US) Co-pending U.S. Appl. No. 14/673,394.
Nov. 12, 2015—(US) Notice of Allowance—U.S. Appl. No. 14/673,394.
Oct. 1, 2015—(US) Notice of Allowance—U.S. Appl. No. 14/673,299.

* cited by examiner

INK SET AND RECORDING METHOD

CROSS REFERENCE TO RELATED APPLICATION

The present application claims priority from Japanese Patent Application No. 2014-072045, filed on Mar. 31, 2014, the disclosure of which is incorporated herein by reference in its entirety.

BACKGROUND OF THE INVENTION

1. Field of the Invention

The present invention relates to an ink set and a recording method.

2. Description of the Related Art

There is a growing need for recorded matters having bright images (metallic luster feeling) formed thereon in recent years. As a method for obtaining the bright recorded matter, there is known a method for discharging a bright pigment ink onto a recording medium having good surface smoothness (high smoothness) such as glossy paper in accordance with the ink-jet system. This method, however, has difficulty in obtaining satisfactory brightness when a recording medium with poor surface smoothness (low smoothness) such as plain paper is used. This is because the bright pigment is not disposed smoothly on the recording medium with poor surface smoothness, which causes the diffuse reflection of light.

In order to obtain the brightness when the recording medium with poor surface smoothness such as plain paper is used, the following ink-jet recording method (Japanese Patent Application laid-open No. 2012-35591 corresponding to United States Patent Application Publication No. 2012/0038702) has been suggested. That is, resin ink, which is obtained by dispersing or dissolving resin components in a solvent in advance, is applied on an area, of the recording medium, where the bright pigment ink is to be discharged, to smooth the unevenness on the surface of the recording medium, and thereby forming a base layer having good surface smoothness.

The method for forming the base layer with the resin ink, however, has the following possibility. That is, the resin components of the resin ink prevent the solvent of the bright pigment ink from permeating the recording medium, which makes it impossible to dispose the bright pigment on the surface of the recording medium smoothly. As a result, a blur and unevenness of the bright pigment ink occur to lose brightness.

SUMMARY OF THE INVENTION

In view of the above, an object of the present teaching is to provide an ink set and a recording method which are capable of obtaining a recorded matter in which a blur and unevenness are inhibited and brightness is good, even when a recording medium having poor surface smoothness is used.

According to a first aspect of the present teaching, there is provided an ink set including: a treatment agent containing 2,2,4-trimethyl-1,3-pentanediol-1-monoisobutyrate or a derivative thereof; and a bright pigment ink containing a bright pigment and water, wherein the treatment agent or the bright pigment ink contains urethane resin; and the ink set satisfies the following conditions (A) and (B):

$1 \leq X \leq 6$ (A)

$0.2 \leq Y/X \leq 2$ (B)

X: the sum of a blending amount (% by weight) of the urethane resin in the treatment agent and a blending amount (% by weight) of the urethane resin in the bright pigment ink Y: a blending amount (% by weight) of the 2,2,4-trimethyl-1,3-pentanediol-1-monoisobutyrate and the derivatives thereof in the treatment agent.

According to a second aspect of the present teaching, there is provided a recording method for recording a medium including: applying the treatment agent constituting the ink set of the first aspect on the recording medium; and discharging the bright pigment ink constituting the ink set of the first aspect on the recording medium to which the treatment agent has been applied.

DESCRIPTION OF THE PREFERRED EMBODIMENTS

An ink set and a recording method of the present teaching may be used in a recording medium having good surface smoothness such as glossy paper. The ink set and the recording method of the present teaching may be used in a recording medium having poor surface smoothness such as plain paper and matte paper. The ink set and the recording method of the present teaching are capable of obtaining a recorded matter in which a blur and unevenness are inhibited and brightness is good, even when the recording medium having poor surface smoothness such as plain paper and matte paper is used.

An explanation will be made about the ink set of the present teaching. The ink set of the present teaching includes a treatment agent and a bright pigment ink.

The treatment agent will be explained first. The treatment agent contains at least one (hereinafter referred to as "TPM or the like") of 2,2,4-trimethyl-1,3-pentanediol-1-monoisobutyrate (TPM) and derivatives thereof.

In the treatment agent, the TPM or the like may function as a film forming aid of the urethane resin. The "film forming" means that particles of the urethane resin which are close to each other due to the loss of moisture, are fused to form a coating film. The TPM or the like facilitates the fusion of particles of the urethane resin. This mechanism, however, is just an assumption and the present teaching is not limited and restricted by the assumption. In order to efficiently form a coating film of resin, it is necessary to select a proper film forming aid depending on the kind of resin. The inventors of the present teaching have found out that the TPM or the like is very effective as the film forming aid of the urethane resin as compared with glycol ether and the like which are conventionally used as film forming aids.

The blending amount of the TPM or the like in the entire amount of the treatment agent is, for example, in a range of 0.3% by weight to 6% by weight, preferably in a range of 0.5% by weight to 5% by weight, and more preferably in a range of 0.8% by weight to 2.5% by weight.

It is preferred that the treatment agent further contain urethane resin. In the ink set of the present teaching, in addition to or instead of the treatment agent, the bright pigment ink which will be described later may contain the urethane resin. That is, in the ink set of the present teaching, the urethane resin may be contained only in the treatment agent, may be contained only in the bright pigment ink, or may be contained both in the treatment agent and the bright pigment ink. For example, in a case that the treatment agent and the bright pigment ink of the ink set of the present teaching are applied onto a recording medium in this order and that the brightness of the recorded matter is treated as important, it is preferred that the treatment agent contain the urethane resin. Meanwhile, in the case that the treatment agent and the bright pigment ink of the ink set of the present teaching are applied onto a recording medium in this order and that the drying property of the treatment agent is treated as important, it is preferred that the bright pigment ink contain the urethane resin.

The urethane resin is not particularly limited, and any urethane resin may be used. It is preferred that the urethane resin be urethane emulsion. The "urethane emulsion" is a system in which urethane resin particles are dispersed in water (hydrophilic solvent may be contained). A method for converting the urethane resin into the urethane emulsion is exemplified, for example, by a method for introducing hydrophilic functional group such as carboxylate group or sulfonate group into the urethane resin to cause self-emulsification and a method for forcibly emulsifying the urethane resin by use of a surfactant. The surfactant is exemplified, for example, by nonionic surfactants, anionic surfactants, cationic surfactants, and ampholytic surfactants. The urethane resin particles contained in the urethane emulsion preferably have an average particle size of 70 nm or less, and more preferably has an average particle size of 20 nm or less. By making the average particle size of the urethane resin particles contained in the urethane emulsion 70 nm or less, it is possible to obtain a recorded matter having better brightness. By making the average particle size of the urethane resin particles contained in the urethane emulsion 20 nm or less, it is possible to obtain a recorded matter in which the blur and unevenness are inhibited further and the brightness is much better. The urethane resin particles contained in the urethane emulsion preferably have an average particle size of 1 nm or more, and more preferably has an average particle size of 5 nm or more. The average particle size of the urethane resin particles contained in the urethane emulsion can be measured as the arithmetic mean diameter, for example, by using a dynamic light scattering particle size analyzer "LB-550" manufactured by HORIBA, Ltd.

The urethane resin may be prepared privately or independently, or any commercially available product may be used for the urethane resin. The commercially available product is exemplified, for example, by "UCOAT (trade name) UWS-145" (average particle size: 20 nm), "PERMARIN (trade name) UA-150" (average particle size: 70 nm), and "PERMARIN (trade name) UA-368" (average particle size: 300 nm) produced by Sanyo Chemical Industries, Ltd., and "SUPERFLEX (trade name) series" produced by DAI-ICHI KOGYO SEIYAKU CO., LTD.

The urethane resin is contained to satisfy the following condition (A). Further, it is preferred that the urethane resin be contained to satisfy the following condition (A1):

$1 \leq X \leq 6$ (A)

$1.5 \leq X \leq 5$ (A1)

X: the sum of a blending amount (% by weight) of the urethane resin in the treatment agent and a blending amount (% by weight) of the urethane resin in the bright pigment ink.

The phrase "the sum of a blending amount of the urethane resin in the treatment agent and a blending amount of the urethane resin in the bright pigment ink" is the sum (T+I) of the blending amount of the urethane resin in the treatment agent (T: % by weight) and the blending amount of the urethane resin in the bright pigment ink (I: % by weight). In a case that the urethane resin is contained only in the treatment agent, I is zero. Thus, the sum (T+I) is the blending amount (T) of the urethane resin in the entire amount of the treatment agent. In a case that the urethane resin is contained only in the bright pigment ink, T is zero. Thus, the sum (T+I) is the blending amount (I) of the urethane resin in the entire amount of the bright pigment ink. A recorded matter having good brightness can be obtained by satisfying $1 \leq X$, and a recorded matter in which the unevenness is inhibited can be obtained by satisfying $X \leq 6$. In a case that the brightness of the recorded matter is treated as important, it is preferred that the urethane resin be contained only in the treatment agent and that "X" in the each of the conditions (A) and (A1) be "a blending amount of the urethane resin in the treatment agent (T: % by weight)".

The urethane resin and the TPM or the like are contained to satisfy the following condition (B):

$0.2 \leq Y/X \leq 2$ (B)

X: the sum of a blending amount (% by weight) of the urethane resin in the treatment agent and a blending amount (% by weight) of the urethane resin in the bright pigment ink Y: a blending amount (% by weight) of TPM or the like in the entire amount of the treatment agent.

A recorded matter having good brightness can be obtained by satisfying $0.2 \leq Y/X$, and a recorded matter in which the unevenness is inhibited can be obtained by satisfying $Y/X \leq 2$.

It is preferred that the urethane resin and the TPM or the like be contained to satisfy the following condition (B1):

$0.3 \leq Y/X \leq 1.6$ (B1)

X: the sum of a blending amount (% by weight) of the urethane resin in the treatment agent and a blending amount (% by weight) of the urethane resin in the bright pigment ink Y: a blending amount (% by weight) of TPM or the like in the entire amount of the treatment agent.

A recorded matter having better brightness can be obtained by satisfying $0.3 \leq Y/X$, and a recorded matter in which the unevenness is inhibited further can be obtained by satisfying $Y/X \leq 1.6$.

The urethane resin and the TPM or the like may be contained to satisfy the following condition (B2):

$0.27 \leq Y/X \leq 1.67$ (B2)

X: the sum of a blending amount (% by weight) of the urethane resin in the treatment agent and a blending amount (% by weight) of the urethane resin in the bright pigment ink Y: a blending amount (% by weight) of TPM or the like in the entire amount of the treatment agent.

The treatment agent may further contain water. The water is preferably ion-exchanged water or pure water (purified water). The water may be contained in the entire amount of the treatment agent, for example, as balance of the other components.

The treatment agent may further contain a water-soluble organic solvent. As the water-soluble organic solvent, it is allowable to use publicly known products or substances. The water-soluble organic solvent is exemplified, for example, by polyvalent (polyhydric) alcohols, polyvalent alcohol derivatives, alcohols, amides, ketones, ketoalcohols (ketone alcohols), ethers, nitrogen-containing solvents, sulfur-containing solvents, propylene carbonate, ethylene carbonate, and 1,3-dimethyl-2-imidazolidinone. The polyvalent alcohols are, exemplified, for example, by glycerol, ethylene glycol, diethylene glycol, propylene glycol, butylene glycol, hexylene glycol, triethylene glycol, polyethylene glycol, dipropylene glycol, tripropylene glycol, polypropylene glycol, trimethylolpropane, 1,5-pentanediol, and 1,2,6-hexanetriol. The polyvalent alcohol derivatives are exemplified, for example, by ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. The alcohols are exemplified, for example, by methyl alcohol, ethyl alcohol, n-propyl alcohol, isopropyl alcohol, n-butyl alcohol, sec-butyl alcohol, isobutyl alcohol, tert-butyl alcohol, and benzyl alcohol. The amides are exemplified, for example, by dimethylformamide and dimethylacetamide. Examples of the ketones include acetone. Examples of the ketone alcohols (ketoalcohols) include diacetone alcohol. The ethers are exemplified, for example, by tetrahydrofuran and dioxane. The nitrogen-containing solvents are exemplified, for example, by pyrrolidone, 2-pyrrolidone, N-methyl-2-pyrrolidone, cyclohexyl pyrrolidone, and triethanolamine. The sulfur-containing solvents are exemplified, for example, by thiodiethanol, thiodiglycol, thiodiglycerol, sulfolane, and dimethylsulfoxide. The blending amount of the water-soluble organic solvent in the entire amount of the treatment agent is not particularly limited. One kind of the water-soluble organic solvent may be used singly, or two or more kinds of the water-soluble organic solvents may be used in combination.

It is preferred that the treatment agent not contain any colorant such as a pigment and a dye. In a case that the treatment agent contains the colorant, the treatment agent preferably contains the colorant in an amount to an extent not affecting the recorded image. In the case that the treatment agent contains the colorant, the blending amount of the colorant in the treatment agent is preferably 1% by weight or less, more preferably 0.1% by weight or less, further preferably 0.01% by weight or less.

As described above, it is preferred that the treatment agent not contain any colorant. The treatment agent, however, may contain the colorant actively or positively. Namely, the treatment agent may contain the colorant in an amount affecting the recorded image. In a case that the treatment agent contains the colorant actively or positively, all of the colors (chromatic colors and achromatic colors including black and grey) can have satisfactory brightness. In the case that the treatment agent contains the colorant actively or positively, the blending amount of the colorant in the entire amount of the treatment agent is, for example, in a range of 0.5% by weight to 20% by weight, preferably in a range of 1% by weight to 15% by weight, and more preferably in a range of 2% by weight to 10% by weight.

The treatment agent may further contain a conventionally known additive, if necessary. The additive is exemplified, for example, by surfactants, viscosity-adjusting agents, surface tension-adjusting agents, antioxidants, and fungicides. The viscosity-adjusting agents are exemplified, for example, by polyvinyl alcohol, cellulose, and water-soluble resin.

The treatment agent can be prepared, for example, by mixing the TPM or the like and other additive component(s) as necessary uniformly or homogeneously by any conventionally known method.

Subsequently, an explanation will be made about the bright pigment ink. The bright pigment ink contains the bright pigment and water.

The bright pigment is not particularly limited, which is exemplified, for example, by metallic particles and pearl pigments. The metallic particles are exemplified, for example, by particles of silver, aluminum, gold, platinum, nickel, chrome, tin, zinc, indium, titanium, and copper. The pearl pigments are exemplified, for example, by pearlescent pigments and pigments having interference brightness such as titanium dioxide coated mica, scaly flakes, and bismuth trichloride. One type (kind) of the bright pigment may be used singly. Alternatively, two or more types (kinds) of bright pigments may be used in combination. Among them, using silver particles or aluminum particles is preferred, and using silver particles is especially preferred.

The average particle size of the bright pigment is preferably in a range of 1 nm to 100 nm, and more preferably in a range of 5 nm to 50 nm. By making the average particle size of the bright pigment within the above range, the bright pigment can be dispersed in the bright pigment ink satisfactory and thus a recorded matter having better brightness can be obtained. The average particle size of the bright pigment can be measured in the similar manner as the average particle size of the urethane resin particles contained in the urethane emulsion.

It is allowable to use, for example, any commercially available product as the bright pigment. The commercially available product is exemplified, for example, by "Silver Nanocolloid H-1 (silver concentration 20%, aqueous dispersion)" (average particle size: 20 nm), "Silver Nanocolloid A-1 (silver concentration 10%, aqueous dispersion)", and "Silver Nanocolloid A-2 (silver concentration 10%, aqueous dispersion)" produced by Mitsubishi Materials Electronic Chemicals Co., Ltd.; "Product number 730785 (silver concentration 0.1%, buffer dispersion)", "Product number 730793 (silver concentration 0.1%, buffer dispersion)", "Product number 730807 (silver concentration 0.1%, buffer dispersion)", "Product number 730815 (silver concentration 0.1%, buffer dispersion)", and "Product number 730777 (silver concentration 0.1%, buffer dispersion)" produced by Sigma-Aldrich Co. LLC.; "PChem/DOWA Nano Ink (silver concentration 20%, aqueous dispersion)" produced by DOWA HOLDINGS Co., Ltd.; "Silver Nano Ink (silver concentration 20%, aqueous dispersion)" produced by MITSUBISHI PAPER MILLS LIMITED.; and "Ag—Cu Nano-particle Paste NAGNCU15-K01" produced by DAIKEN CHEMICAL CO., LTD.

The blending amount of the bright pigment in the entire amount of the bright pigment ink (bright pigment ratio) is, for example, in a range of 0.5% by weight to 20% by weight, preferably in a range of 1% by weight to 12% by weight, and more preferably in a range of 2% by weight to 10% by weight. By making the bright pigment ratio 2% by weight or more, a recorded matter having better brightness can be obtained. By making the bright pigment ratio 10% by weight or less, a recorded matter in which the unevenness and blur are inhibited further can be obtained. From the viewpoint of discharge stability, it is further preferred that the bright pigment ratio be in a range of 2% by weight to 5% by weight.

The water is preferably ion-exchanged water or pure water (purified water). The blending amount of water (water ratio) in the entire amount of the bright pigment ink is, for example, in a range of 10% by weight to 80% by weight, and preferably in a range of 40% by weight to 80% by weight. The water ratio may be, for example, the balance of the other components.

In a case that the treatment agent contains no urethane resin, the bright pigment ink contains the urethane resin. On the other hand, in a case that the treatment agent contains the urethane resin, the bright pigment ink may not contain the urethane resin. The kinds of urethane resins and preferred blending amounts thereof are the same as those described in the treatment agent. In the ink set of the present teaching, in a case that the urethane resin is contained only in the bright pigment ink (no urethane resin is contained in the treatment agent), it is possible to shorten the drying time of the treatment agent. For example, in a case that the treatment agent and the bright pigment ink of the ink set of the present teaching are applied onto a recording medium in this order, the treatment agent having a good drying property can reduce the time after the application of the treatment agent before the discharge of the bright pigment ink. This improves the whole throughput.

It is preferred that the bright pigment ink further contain a water-soluble organic solvent. The water-soluble organic solvent is exemplified, for example, by a humectant which prevents the bright pigment ink from drying at an end of a nozzle in an ink-jet head and a penetrant which adjusts a drying rate of the bright pigment ink on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. One type (kind) of the humectant as described above may be used singly, or two or more types (kinds) of the humectants as described above may be used in combination. Among them, it is preferable to use polyvalent alcohols such as alkylene glycol and glycerol.

The blending amount of the humectant in the entire amount of the bright pigment ink, is for example, in a range of 0% by weight to 95% by weight, preferably in a range of 5% by weight to 80% by weight, and more preferably in a range of 5% by weight to 50% by weight.

The penetrant is exemplified, for example, by glycol ether. The glycol ether is exemplified, for example, by ethylene glycol methyl ether, ethylene glycol ethyl ether, ethylene glycol n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One type (kind) of the penetrant as described above may be used singly, or two or more types (kinds) of the penetrants as described above may be used in combination.

The blending amount of the penetrant in the entire amount of the bright pigment ink is, for example, in a range of 0% by weight to 20% by weight, preferably in a range of 0.1% by weight to 15% by weight, and more preferably in a range of 1% by weight to 5% by weight.

The bright pigment ink may further contain a conventionally known additive, if necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol, cellulose, and water-soluble resin.

The bright pigment ink can be prepared, for example, as follows. That is, the bright pigment, water, and other additive component(s) as necessary are mixed uniformly in accordance with any conventionally known method, and undissolved matters are removed by a filter or the like.

The ink set of the present teaching may include, in addition to the treatment agent and the bright pigment ink, a water-based ink containing a colorant and water. All of the colors (full color) can have brightness provided that the ink set of the present teaching includes the water-based ink containing the colorant. The ink set of the present teaching may include a plurality of water-based inks such as a water-based cyan ink, a water-based magenta ink, a water-based yellow ink, and a water-based black ink.

The colorant contained in the water-based ink may be either a pigment or a dye. The mixture of the pigment and the dye may be used as the colorant. As the colorant contained in the water-based ink, it is possible to use any dye, any pigment, or the like used widely. The blending amount of the colorant in the entire amount of the water-based ink is not particularly limited, and the blending amount is, for example, in a range of 0.5% by weight to 20% by weight, preferably in a range of 1% by weight to 15% by weight, and more preferably in a range of 2% by weight to 10% by weight.

The water is preferably ion-exchanged water or pure water (purified water). The blending amount of the water (water ratio) in the entire amount of the water-based ink is, for example, in a range of 10% by weight to 98% by weight, and preferably in a range of 40% by weight to 98% by weight. The water ratio may be, for example, the balance of the other components.

It is preferred that the water-based ink further contain a water-soluble organic solvent. The water-soluble organic solvent is exemplified, for example, by a humectant which prevents the water-based ink from drying at an end of a nozzle in an ink-jet head and a penetrant which adjusts a drying rate of the water-based ink on a recording medium. As the humectant and the penetrant, it is possible to use any of them which are used in the bright pigment ink and are exemplified above. The blending amount of the humectant in the entire amount of the water-based ink is, for example, in a range of 0% by weight to 95% by weight, preferably in a range of 5% by weight to 80% by weight, and more preferably in a range of 5% by weight to 50% by weight. The blending amount of the penetrant in the entire amount of the water-based ink is, for example, in a range of 0% by weight to 20% by weight, preferably in a range of 0.1% by weight to 15% by weight, and more preferably in a range of 1% by weight to 5% by weight.

The water-based ink may further contain a conventionally known additive, if necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol, cellulose, and water-soluble resin.

The water-based ink can be prepared, for example, as follows. That is, the colorant, water, and other additive component(s) as necessary are mixed uniformly in accordance with any conventionally known method, and undissolved matters are removed by a filter or the like.

It is especially preferred that the ink set of the present teaching be obtained to meet the following conditions: the treatment agent contains the urethane resin; the treatment agent contains the urethane resin and the TPM or the like to satisfy the above condition (B1); the urethane resin particles, contained in the urethane emulsion, having an average particle size of 20 urn or less were used as the urethane resin; and the bright pigment ratio is in a range of 2% by weight to 10% by weight. The ink set of the present teaching obtained as described above can obtain a recorded matter in which the blur and unevenness are strongly inhibited and the brightness is extremely good.

The ink set of the present teaching can be also provided as an ink cartridge. For example, the ink cartridge of the present teaching has a treatment agent accommodating section and an ink accommodating section. The treatment agent constituting the ink set of the present teaching is accommodated in the treatment agent accommodating section, and the bright pigment ink constituting the ink set of the present teaching is accommodated in the ink accommodating section. The ink cartridge of the present teaching may have an accommodating section for any water-based ink other than the bright pigment ink constituting the ink set of the present teaching.

The ink cartridge of the present teaching may be an ink cartridge assembly wherein an ink cartridge and a treatment agent cartridge formed individually and independently from the ink cartridge are assembled. Alternatively, the ink cartridge of the present teaching may be an integrated type ink cartridge of which interior is comparted to form the treatment agent accommodating section and the ink accommodating section. For example, any conventionally known main body (body) of an ink cartridge can be used for the main, body of the ink cartridge of the present teaching.

Next, an explanation will be made about the recording method and an ink-jet recording apparatus of the present teaching.

The recording method of the present teaching includes a pretreatment step and a recording step, the pretreatment step being a step for applying a treatment agent on a recording medium, the recording step being a step for performing recording by discharging a bright pigment ink in accordance with the ink-jet system on the recording medium to which the treatment agent has been applied. In the recording method of the present teaching, the treatment agent and the bright pigment ink constituting the ink set of the present teaching are used as the treatment agent and the bright pigment ink.

The ink-jet recording apparatus of the present teaching includes an ink set accommodating section, a treatment agent application mechanism, and an ink discharge mechanism. In the ink jet recording apparatus of the present teaching, the ink set accommodating section accommodates the ink set of the present teaching, the treatment agent application mechanism applies the treatment agent constituting the ink set onto a recording medium, and the ink discharge mechanism discharges the bright pigment ink constituting the ink set onto the recording medium.

The ink jet recording method of the present teaching can be performed, for example, by using the ink-jet recording apparatus of the present teaching. The recording includes printing text (character, letter), printing image or picture, printing, etc.

Figure 1:
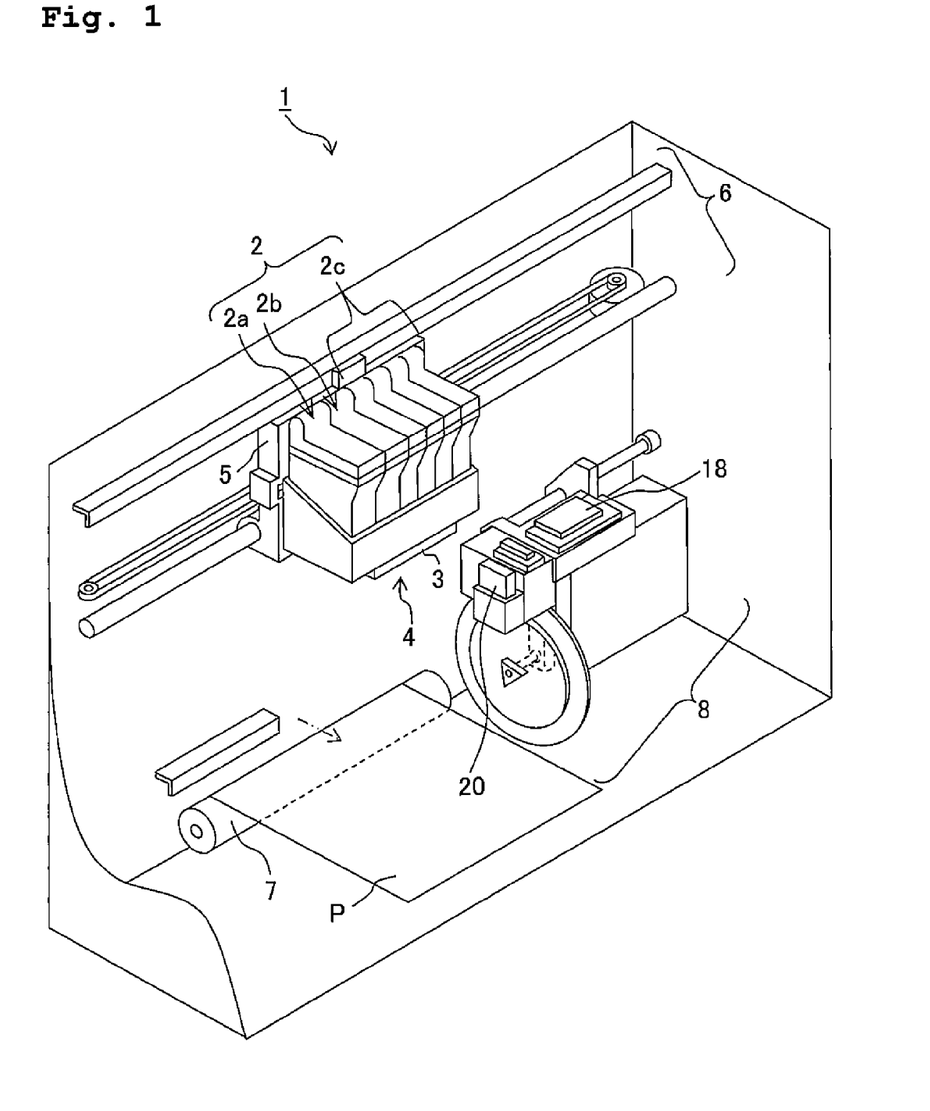
FIG. 1 is a schematic perspective view of an exemplary construction of an ink jet recording apparatus of the present teaching.

FIG. 1 depicts an exemplary construction of the ink-jet recording apparatus of the present teaching. As depicted in FIG. 1, an ink jet recording apparatus 1 includes, as main constitutive elements, an ink cartridge assembly 2, an ink discharge mechanism (ink-jet head) 3, a head unit 4, a carriage 5, a drive unit 6, a platen roller 7, and a purge unit 8.

The ink cartridge assembly 2 includes a treatment agent cartridge 2a, a bright pigment ink cartridge 2b, and four water-based ink cartridges 2c. The treatment agent cartridge 2a contains the treatment agent constituting the ink set of the present teaching. The bright pigment ink cartridge 2b contains the bright pigment ink constituting the ink set of the present teaching. Each of the four water-based ink cartridges 2c contains one of four water-based inks of yellow, magenta, cyan, and black. At least one of the four water-based inks may be the bright pigment ink constituting the ink set of the present teaching. In this case, the ink cartridge assembly 2 may be constructed only of the treatment agent cartridge 2a and the four water-based ink cartridges 2c without including the bright pigment ink cartridge 2b.

The ink jet head 3, which is installed on the head unit 4, performs recording on a recording medium P (for example, recording sheet). The ink cartridge assembly 2 and the head unit 4 are carried on the carriage 5. The driving unit 6 reciprocatively moves the carriage 5 in a linear direction. For example, a conventionally known driving unit can be used as the driving unit 6 (see, for example, Japanese Patent Application Laid-open No. 2008-246821 corresponding to United States Patent Application Publication No. US 2008/0241398). The platen roller 7 extends in the reciprocating direction of the carriage 5, and the platen roller 7 is disposed to face the ink-jet head 3.

The purge device 8 sucks any unsatisfactory ink which contains air bubbles, etc. accumulated in the ink-jet head 3. As the purge device 8, it is possible to use, for example, a conventionally known purge device (for example, see Japanese Patent Application Laid-open No. 2008-246821 corresponding to United States Patent Application Publication No. US 2008/0241398).

A wiper member 20 is provided on the purge unit 8, at a position on the side of the platen roller 7 such that the wiper member 20 is adjacent to the purge unit 8. The wiper member 20 is formed to have a spatula form, and wipes a nozzle-formation surface of the ink jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the treatment agent, the bright pigment ink, and the water-based inks from drying.

In the ink-jet recording apparatus 1 of this example, the ink cartridge assembly 2 is provided, together with the head unit 4, on one carriage 5. Note that, however, the present teaching is not limited to this. In the ink-jet recording apparatus 1, respective cartridges of the ink cartridge assembly 2 may be provided on another carriage which is different from that for the head unit 4. Alternatively, respective cartridges of the ink cartridge assembly 2 may be arranged and fixed inside the ink-jet recording apparatus 1, rather than being provided on the carriage 5. In such an aspect, for example, respective cartridges of the ink cartridge assembly 2 and the head unit 4 which is provided on the carriage 5 are connected with tubes, etc., and the treatment agent, the bright pigment ink, and the water-based inks are supplied from respective cartridges of the ink cartridge assembly 2 to the head unit 4 via the tubes.

Figure 2A:
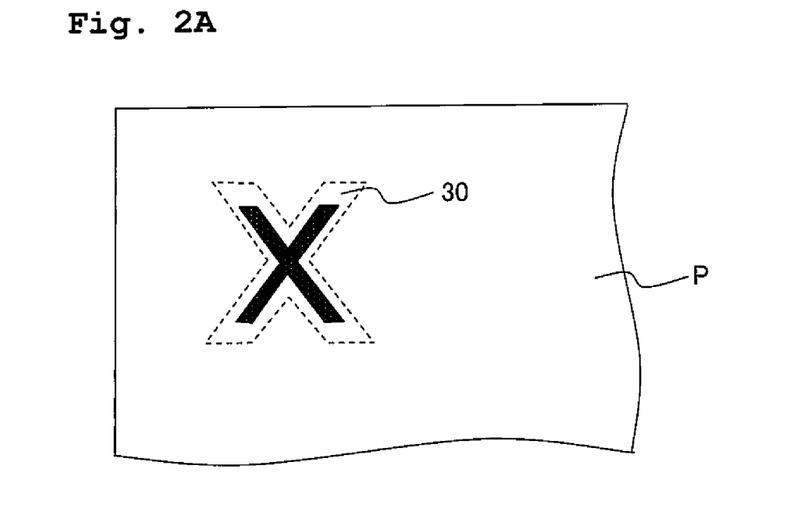
FIGS. 2A and 2B are diagrams each depicting a recording example by a recording method of the present teaching.
Figure 2B:
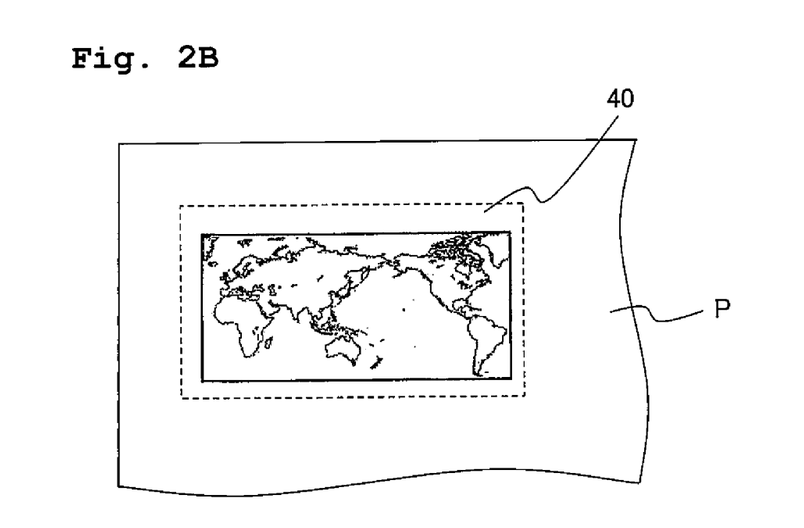

The recording using the ink jet recording apparatus 1 is performed, for example, in the following manner. At first, a recording sheet P is supplied or fed, for example, from a paper feeding cassette (not depicted in the drawings) arranged at a side of or at a position below the ink-jet recording apparatus 1. The recording sheet P is introduced between the ink-jet head 3 and the platen roller 7. The treatment agent constituting the ink set of the present teaching is applied (discharged) from the ink-jet head 3 onto the introduced recording sheet P. The treatment agent may be applied over the entire recording surface of the recording sheet P or on a part of the recording surface of the recording sheet P. In a case of applying the treatment agent onto a part of the recording surface of the recording sheet P, at least a part, of the recording sheet P, on which recording is to be performed with the bright pigment ink, is an application portion of the treatment agent. Further, it is preferred that the size of the application portion of the treatment agent be greater than the size of the recorded portion with the bright pigment ink. For example, as depicted in FIG. 2A, in a case that a letter "X" is recorded on a recording sheet P, it is preferred that the treatment agent be applied on the recording sheet P to form an application portion 30 of which line width is greater than the line width of the letter "X". Further, as depicted in FIG. 2B, in a case that a pattern, an image, or the like is recorded on a recording sheet P, it is preferred that the treatment agent be applied on the recording sheet P to form an application portion 40, the size of which is greater than that of the pattern or the like.

Next, predetermined recording is performed on the application portion of the treatment agent of the recording sheet P by use of the bright pigment ink discharged from the ink jet head 3. The time (time interval) from the discharge of the treatment agent until the discharge of the bright pigment ink is not particularly limited. For example, it is allowable to perform the discharge of the bright pigment ink in the same scanning during which the discharge of the treatment agent is also performed. A recorded matter obtained by using the ink set of the present teaching has excellent brightness and hardly suffers from the unevenness and blur, even when a recording medium having poor surface smoothness such as plain paper and matte paper is used as the recording sheet P. Subsequently, the recording with the water-based ink(s) discharged from the ink jet head 3 is performed if necessary, and the recording sheet P on which the recording has been performed is discharged from the ink-jet recording apparatus 1. In FIG. 1, illustrations of a feed mechanism and a discharge mechanism for the recording sheet P are omitted.

In the ink-jet recording apparatus 1 of this example, the ink-jet head 3 functions also as the treatment agent application mechanism. The present teaching, however, is not limited to this. In the present teaching, the application of the treatment agent may be performed, for example, by a system or method such as stamp coating (application), brush coating, and roller coating.

Although the apparatus depicted in FIG. 1 adopts an ink-jet head of the serial type, the present teaching is not limited to this. The ink jet recording apparatus may be an apparatus adopting an ink jet head of the line type.

As described above, in the ink set of the present teaching, the treatment agent, which is to be applied on a recording medium before ink jet recording, contains the TPM or the like and at least one of the treatment agent and the bright pigment ink contains the urethane resin to satisfy the above conditions (A) and (B). Using the ink set of the present teaching can obtain a recorded matter in which the blur and unevenness are inhibited and the brightness is good, even when a recording medium having poor surface smoothness is used.

EXAMPLES

Next, examples of the present teaching will be explained together with comparative examples. Note that the present teaching is not limited and is not restricted to the examples and the comparative examples which will be described below.

Examples 1 to 21 and Comparative Examples 1 to 8

<Preparation of Treatment Agent>
Respective components indicated in a treatment agent composition (TABLE 1) were mixed uniformly or homogeneously, thereby obtaining each of the treatment agents 1 to 24. In TABLE 1, the unit of the composition of each of the treatment agents is % by weight, and each numerical value in TABLE 1 indicates an active-ingredient amount (solid content amount).

<Preparation of Bright Pigment Ink>
Components, except for the bright pigment, which were included in a bright pigment ink composition (TABLE 2) were mixed uniformly or homogeneously, thereby obtaining an ink solvent. Subsequently, the ink solvent was added to the bright pigment, followed by being mixed uniformly. After that, the obtained mixture was filtrated through a cellulose acetate membrane filter (pore size 3.00 μm) produced by Toyo Roshi Kaisha, Ltd., and thereby obtaining each of the bright pigment inks 1 to 6. In TABLE 2, the unit of the composition of each of the bright pigment inks is % by weight, and each numerical value in TABLE 2 indicates an active-ingredient amount (solid content amount).

Table 1 (following)—Legend

1: Produced by Sanyo Chemical Industries, Ltd.; average particle size: 20 nm
2: Produced by Sanyo Chemical Industries, Ltd.; average particle size: 70 nm
3: Produced by Sanyo Chemical Industries, Ltd.; average particle size: 300 nm
4: Acylic resin; produced by SEIKO PMC CORPORATION; average particle size: 440 nm
5: Styrene-acryl resin; produced by SEIKO PMC CORPORATION; average particle size: 250 nm

TABLE 1

| | | Treatment agents (% by weight) | | | | | | | | | |
|---|---|---|---|---|---|---|---|---|---|---|---|
| | | 1 | 2 | 3 | 4 | 5 | 6 | 7 | 8 | 9 | 10 |
| Urethane resin (X) | UCOAT (trade name) UWS-145 (*1) | 3 | 3 | 3 | 3 | 3 | 3 | 3 | 1 | 1.5 | 2 |
| | PERMARIN (trade name) UA-150 (*2) | — | — | — | — | — | — | — | — | — | — |

TABLE 1-continued

| | | Treatment agents (% by weight) | | | | | | | | | |
|---|---|---|---|---|---|---|---|---|---|---|---|
| | | 1 | 2 | 3 | 4 | 5 | 6 | 7 | 8 | 9 | 10 |
| Urethane resin (X) | UCOAT (trade name) UWS-145 (*1) | | | | | | | | | | |
| | PERMARIN (trade name) UA-150 (*2) | | | | | | | | | | |
| | PERMARIN (trade name) UA-368 (*3) | — | — | — | — | — | — | — | — | — | — |
| Other resin (X) | F-52 (*4) | | | | | | | | | | |
| | PE-1304 (*5) | | | | | | | | | | |
| Film forming aid (Y) | TPM | 0.6 | 0.8 | 1 | 1.5 | 3 | 5 | 6 | 0.5 | 0.75 | 1 |
| | Polypropylene glycol monomethyl ether | — | — | — | — | — | — | — | — | — | — |
| | Water | balance | balance | balance | balance | balance | balance | balance | balance | balance | balance |
| | Y/X | 0.20 | 0.27 | 0.33 | 0.50 | 1.00 | 1.67 | 2.00 | 0.50 | 0.50 | 0.50 |

| | | Treatment agents (% by weight) | | | | | | | | | |
|---|---|---|---|---|---|---|---|---|---|---|---|
| | | 11 | 12 | 13 | 14 | 15 | 16 | 17 | 18 | 19 | 20 |
| Urethane resin (X) | UCOAT (trade name) UWS-145 (*1) | 4 | 5 | 6 | — | — | — | 3 | 7 | 0.3 | 3 |
| | PERMARIN (trade name) UA-150 (*2) | — | — | — | 3 | 4 | — | — | — | — | — |
| | PERMARIN (trade name) UA-368 (*3) | — | — | — | — | — | 3 | — | — | — | — |
| Other resin (X) | F-52 (*4) | — | — | — | — | — | — | — | — | — | — |
| | PE-1304 (*5) | — | — | — | — | — | — | — | — | — | — |
| Film forming aid (Y) | TPM | 2 | 2.5 | 3 | 1.5 | 1.5 | 1.5 | — | 3.5 | 0.15 | 0.2 |
| | Polypropylene glycol monomethyl ether | — | — | — | — | — | — | — | — | — | — |
| | Water | balance | balance | balance | balance | balance | balance | balance | balance | balance | balance |
| | Y/X | 0.50 | 0.50 | 0.50 | 0.50 | 0.38 | 0.50 | 0 | 0.50 | 0.50 | 0.07 |

| | | Treatment agents (% by weight) | | | |
|---|---|---|---|---|---|
| | | 21 | 22 | 23 | 24 |
| Urethane resin (X) | UCOAT (trade name) UWS-145 (*1) | 3 | 3 | — | — |
| | PERMARIN (trade name) UA-150 (*2) | — | — | — | — |
| | PERMARIN (trade name) UA-368 (*3) | — | — | — | — |
| Other resin (X) | F-52 (*4) | — | — | 3 | — |
| | PE-1304 (*5) | — | — | — | 3 |
| Film forming aid (Y) | TPM | 7 | — | 1.5 | 1.5 |
| | Polypropylene glycol monomethyl ether | — | 1.5 | — | — |
| | Water | balance | balance | balance | balance |
| | Y/X | 2.33 | 0.50 | 0.50 | 0.50 |

Table 2 (following)—Legend

6: Produced by Mitsubishi Materials Electronic Chemicals Co., Ltd.; average particle size: 20 nm 7: Acetylene glycol surfactant (ethylene oxide (10 mol) adduct of diol); produced by Nissin Chemical Co., Ltd; active-ingredient: 100%

8: Sodium polyoxyethylene alkyl (C=12, 13) ether sulfate (3E.O.); produced by Lion Corporation; active-ingredient: 28% by weight 9: Produced by Arch Chemicals

TABLE 2

| | | Bright pigment inks (% by weight) | | | | | |
|---|---|---|---|---|---|---|---|
| | | 1 | 2 | 3 | 4 | 5 | 6 |
| Bright pigment | Silver Nanocolloid H-1 (*6) | 1 | 2 | 3 | 5 | 10 | 12 |
| Humectant | Glycerol | 30 | 15 | 30 | 30 | 28 | 30 |
| | Triethylene glycol | — | 15 | — | — | — | — |
| Penetrant | Triethylene glycol n-butyl ether | — | — | — | — | 2 | — |
| Surfactant | OLFINE (trade name) E1010 (*7) | — | 0.5 | 1 | 1 | 1 | 2 |
| | SUNNOL (trade name) NL-1430 (*8) | 1 | — | — | — | — | — |
| Fungicide | Proxel GXL (S) (*9) | 0.1 | 0.1 | 0.1 | 0.1 | 0.1 | 0.1 |
| | Water | balance | balance | balance | balance | balance | balance |

As indicated in TABLE 3, the treatment agent was combined with the bright pigment ink, thereby obtaining each of the ink sets of Examples 1 to 21 and Comparative Examples 1 to 8.

There were performed (a) evaluation of brightness of the recorded portion, (b) evaluation of unevenness of the recorded portion, (c) evaluation of blur of the recorded portion, and (d) overall evaluation on the ink sets of Examples 1 to 21 and Comparative Examples 1 to 8 by the following methods. The samples used in the evaluations (a), (b), and (c) were prepared as follows.

<Preparation of Evaluation Samples>

The treatment agent constituting each of the ink sets of Examples 1 to 21 and Comparative Examples 1 to 8 was applied on a matte paper (BP60MA, produced by BROTHER KOGYO KABUSHIKI KAISHA) with a bar coater (Bar Coater, Rod No. 3 produced by Yasuda Seiki Seisakusho, Ltd.). Subsequently, an ink-jet printer MFC-J4510N produced by BROTHER KOGYO KABUSHIKI KAISHA was used to record an image with the bright pigment ink constituting each of the ink sets of Examples 1 to 21 and Comparative Examples 1 to 8 on the matte paper at a resolution of 600 dpi×2400 dpi.

(a) Evaluation of Brightness of the Recorded Portion

The solid portion of each of the evaluation samples was observed visually, and the brightness of the image was evaluated in accordance with the following evaluation criterion.

<Evaluation of Brightness of the Recorded Portion and Evaluation Criterion>

A: Brightness was sufficient.

B: Brightness was slightly poor, but no problem for practical use.

C: There was no brightness, which would cause a problem for practical use.

(b) Evaluation of Unevenness of the Recorded Portion

The solid portion of each of the evaluation samples was observed visually, and the unevenness was evaluated in accordance with the following evaluation criterion.

<Evaluation of Unevenness of the Recorded Portion and Evaluation Criterion>

A: No unevenness was observed.

B: Unevenness was slightly observed, but no problem for practical use.

C: Unevenness was observed clearly, which would cause a problem for practical use.

(c) Evaluation of Blur of the Recorded Portion

The solid portion of each of the evaluation samples was observed visually, and the blur was evaluated in accordance with the following evaluation criterion.

<Evaluation of Blur of the Recorded Portion and Evaluation Criterion>

A: No blur was observed.

B: Blur was slightly observed, but no problem for practical use.

C: Blur was observed clearly, which would cause a problem for practical use.

(d) Overall Evaluation

The overall evaluation was performed based on the results (a) to (c) in accordance with the following criterion.

<Overall Evaluation and Evaluation Criterion>

G: All of the results (a) to (c) were "A" or "B".

NG: There was "C" in any of the results (a) to (c).

The evaluation results of Examples 1 to 21 and Comparative Examples 1 to 8 axe indicated in TABLE 3.

TABLE 3

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Treatment agent | 1 | 2 | 3 | 4 | 5 | 6 | 7 | 8 | 9 | 10 | 11 | 12 | 13 |
| X | 3 | 3 | 3 | 3 | 3 | 3 | 3 | 1 | 1.5 | 2 | 4 | 5 | 6 |
| Y/X | 0.20 | 0.27 | 0.33 | 0.50 | 1.00 | 1.67 | 2.00 | 0.50 | 0.50 | 0.50 | 0.50 | 0.50 | 0.50 |
| Bright pigment ink | | | | | | | 3 | | | | | | |
| Bright pigment ratio (% by weight) | | | | | | | 3 | | | | | | |
| Brightness of recorded portion | B | A | A | A | A | A | A | B | A | A | A | A | A |
| Unevenness of recorded portion | A | A | A | A | A | A | B | A | A | A | A | A | B |
| Blur of recorded portion | A | A | A | A | A | A | A | B | A | A | A | A | B |
| Overall evaluation | G | G | G | G | G | G | G | G | G | G | G | G | G |

| | Examples | | | | | | | | Comparative Examples | | | | |
|---|---|---|---|---|---|---|---|---|---|---|---|---|---|
| | 14 | 15 | 16 | 17 | 18 | 19 | 20 | 21 | 1 | 2 | 3 | 4 | 5 |
| Treatment agent | 14 | 15 | 16 | | | 4 | | | 17 | 18 | 19 | 20 | 21 |
| X | 3 | 4 | 3 | | | 3 | | | 3 | 7 | 0.3 | 3 | 3 |
| Y/X | 0.50 | 0.38 | 0.50 | | | 0.50 | | | 0 | 0.50 | 0.50 | 0.07 | 2.33 |
| Bright pigment ink | | 3 | | 1 | 2 | 4 | 5 | 6 | | | 3 | | |
| Bright pigment ratio (% by weight) | | 3 | | 1 | 2 | 5 | 10 | 12 | | | 3 | | |
| Brightness of recorded portion | A | A | B | B | A | A | A | A | C | A | C | C | A |
| Unevenness of recorded portion | A | B | B | A | A | A | A | B | A | C | A | A | C |

TABLE 3-continued

| Blur of recorded portion | A | A | A | A | A | A | A | B | A | B | B | A | B |
|---|---|---|---|---|---|---|---|---|---|---|---|---|---|
| Overall evaluation | G | G | G | G | G | G | G | G | NG | NG | NG | NG | NG |

| | Comparative Examples | | |
|---|---|---|---|
| | 6 | 7 | 8 |
| Treatment agent | 22 | 23 | 24 |
| X | 3 | 3 | 3 |
| Y/X | 0.50 | 0.50 | 0.50 |
| Bright pigment ink | | 3 | |
| Bright pigment ratio (% by weight) | | 3 | |
| Brightness of recorded portion | C | C | C |
| Unevenness of recorded portion | A | A | A |
| Blur of recorded portion | A | C | C |
| Overall evaluation | NG | NG | NG |

As indicated in TABLE 3, Examples 1 to 21 had good evaluation results of all of the brightness of the recorded portion, the unevenness of the recorded portion, and the blur of the recorded portion. Especially, Examples 3 to 5, 9 to 12, and 18 to 20 had extremely good evaluation results of all of the brightness of the recorded portion, the unevenness of the recorded portion, and the blur of the recorded portion, each of Examples 3 to 5, 9 to 12, and 18 to 20 being obtained to meet the following conditions: the treatment agent contained the urethane resin and the TPM or the like to satisfy the condition (B1); the urethane resin particles, contained in the urethane emulsion, having an average particle size of 20 nm or less were used as the urethane resin; and the bright pigment ratio was in a range of 2% by weight to 10% by weight. Further, Examples 2 to 6, 9 to 12, 14, and 18 to 20 had extremely good evaluation results of all of the brightness of the recorded portion, the unevenness of the recorded portion, and the blur of the recorded portion, each of Examples 2 to 6, 9 to 12, and 18 to 20 being obtained to meet the following conditions: the treatment agent contained the urethane resin and the TPM or the like to satisfy the conditions (A1) and (B2); the urethane resin particles, contained in the urethane emulsion, having an average particle size of 20 nm or less were used as the urethane resin; and the bright pigment ratio was in a range of 2% by weight to 10% by weight.

Meanwhile, Comparative Example 1 in which the treatment agent and the bright pigment ink contained no urethane resin had a bad evaluation result of the brightness of the recorded portion. Comparative Example 2 in which X was 7>6 and the condition (A) was not satisfied had a bad evaluation result of the unevenness of the recorded portion. Comparative Example 3 in which X was 0.3<1 and the condition (A) was not satisfied had a bad evaluation result of the brightness of the recorded portion. Comparative Example 4 in which Y/X was 0.07<0.2 and the condition (B) was not satisfied had a bad evaluation result of the brightness of the recorded portion. Comparative Example 5 in which Y/X was 2.33>2 and the condition (B) was not satisfied had a bad evaluation result of the unevenness of the recorded portion. Comparative Example 6 in which the treatment agent contained polypropylene glycol methyl ether instead of the TPM had a bad evaluation result of the brightness of the recorded portion. Each of Comparative Examples 7 and 8 in which the treatment agent contained other resin instead of the urethane resin had bad evaluation results of the brightness of the recorded portion and the blur of the recorded portion.

As described above, using the ink set of the present teaching is capable of obtaining a recorded matter in which a blur and unevenness are inhibited and brightness is good even when a recording medium having poor surface smoothness is used. The way of use of the ink set of the present teaching is not particularly limited, and the ink set is widely applicable to various types of ink-jet recording.

What is claimed is:

1. An ink set, comprising:
   a treatment agent containing 2,2,4-trimethyl-1,3-pentanediol-1-monoisobutyrate or a derivative thereof; and
   a bright pigment ink containing a bright pigment and water,
   wherein the treatment agent or the bright pigment ink contains urethane resin comprising urethane particles contained in a urethane emulsion; and the ink set satisfies the following conditions (A) and (B):

$$1 \leq X \leq 6 \tag{A}$$

$$0.2 \leq Y/X \leq 2, \tag{B}$$

wherein X: the sum of a blending amount (% by weight) of the urethane resin in the treatment agent, if any, and a blending amount (% by weight) of the urethane resin in the bright pigment ink, if any, and
   Y: a blending amount (% by weight) of the 2,2,4-trimethyl-1,3-pentanediol-1-monoisobutyrate and the derivative thereof in the treatment agent.

2. The ink set according to claim 1, wherein the ink set satisfies the following condition (B1):

$$0.3 \leq Y/X < 1.6, \tag{B1}$$

wherein X: the sum of a blending amount (% by weight) of the urethane resin in the treatment agent, if any, and a blending amount (% by weight) of the urethane resin in the bright pigment ink, if any, and
   Y: a blending amount (% by weight) of the 2,2,4-trimethyl-1,3-pentanediol-1-monoisobutyrate and the derivative thereof in the treatment agent.

3. The ink set according to claim 1, wherein the ink set satisfies the following condition (A1):

$$1.5 \leq X \leq 5, \tag{A1}$$

wherein X: the sum of a blending amount (% by weight) of the urethane resin in the treatment agent, if any, and a blending amount (% by weight) of the urethane resin in the bright pigment ink, if any.

4. The ink set according to claim 1, wherein the ink set satisfies the following condition (B2):

$$0.27 \leq Y/X \leq 1.67, \quad (B2)$$

wherein X: the sum of a blending amount (% by weight) of the urethane resin in the treatment agent, if any, and a blending amount (% by weight) of the urethane resin in the bright pigment ink, if any, and Y: a blending amount (% by weight) of the 2,2,4-trimethyl-1,3-pentanediol-1-monoisobutyrate and the derivative thereof in the treatment agent.

5. The ink set according to claim 1, wherein the treatment agent contains the urethane resin.

6. The ink set according to claim 1, wherein the bright pigment ink contains the urethane resin.

7. The ink set according to claim 1, wherein the urethane resin particles contained in the urethane emulsion have an average particle size of 70 nm or less.

8. The ink set according to claim 1, wherein the urethane resin particles contained in the urethane emulsion have an average particle size of 20 nm or less.

9. The ink set according to claim 1, wherein the treatment agent contains the 2,2,4-trimethyl-1,3-pentanediol-1-monoisobutyrate.

10. The ink set according to claim 1, wherein the bright pigment is silver particles or aluminum particles.

11. The ink set according to claim 1, wherein the bright pigment is silver particles.

12. The ink set according to claim 1, wherein the bright pigment ink contains 1% by weight to 12% by weight of the bright pigment.

13. The ink set according to claim 1, wherein the bright pigment ink contains 2% by weight to 10% by weight of the bright pigment.

14. The ink set according to claim 1, wherein the treatment agent
   contains the urethane resin;
   the urethane resin particles, contained in the urethane emulsion, have an average particle size of 20 nm or less;
   the ink set satisfies the following condition (B1):

$$0.3 \leq Y/X \leq 1.6, \quad (B1)$$

wherein X: the sum of a blending amount (% by weight) of the urethane resin in the treatment agent, if any, and a blending amount (% by weight) of the urethane resin in the bright pigment ink, if any;

Y: a blending amount (% by weight) of the 2,2,4-trimethyl-1,3-pentanediol-1-monoisobutyrate and the derivative thereof in the treatment agent; and the bright pigment ink contains 2% by weight to 10% by weight of the bright pigment.

15. The ink set according to claim 1, wherein the treatment agent contains the urethane resin;
   the urethane resin particles, contained in the urethane emulsion, have an average particle size of 20 nm or less;
   the ink set satisfies the following conditions (A1) and (B2):

$$1.5 \leq X \leq 5 \quad (A1)$$

$$0.27 \leq Y/X \leq 1.67, \quad (B2)$$

wherein X: the sum of a blending amount (% by weight) of the urethane resin in the treatment agent, if any, and a blending amount (% by weight) of the urethane resin in the bright pigment ink, if any;

Y: a blending amount (% by weight) of the 2,2,4-trimethyl-1,3-pentanediol-1-monoisobutyrate and the derivative thereof in the treatment agent; and the bright pigment ink contains 2% by weight to 10% by weight of the bright pigment.

16. The ink set according to claim 1, further comprising at least one of water-based inks containing a colorant and water.

17. The ink set according to claim 16, wherein at least one of the water-based inks includes a cyan water-based ink, a magenta water-based ink, a yellow water-based ink, and a black water-based ink.

18. A recording method for recording a medium comprising:
   applying the treatment agent constituting the ink set as defined in claim 1 on the recording medium; and
   discharging the bright pigment ink constituting the ink set as defined in claim 1 on the recording medium to which the treatment agent has been applied.

* * * * *